US009346558B2

(12) United States Patent
Masse et al.

(10) Patent No.: US 9,346,558 B2
(45) Date of Patent: May 24, 2016

(54) METHOD FOR MONITORING A DEGRADATION OF AN ON-BOARD DEVICE OF AN AIRCRAFT WITH AUTOMATIC DETERMINATION OF A DECISION THRESHOLD

(71) Applicant: SNECMA, Paris (FR)

(72) Inventors: Jean-Remi Andre Masse, Saint Cloud (FR); Pierre Jean Emile Beauseroy, Troyes (FR); Xavier Boulet, Nousty (FR); Edith Grall-Maes, Saint-Pouange (FR); Ouadie Hmad, Montereau Fault Yonne (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/401,265

(22) PCT Filed: May 15, 2013

(86) PCT No.: PCT/FR2013/051059
§ 371 (c)(1),
(2) Date: Nov. 14, 2014

(87) PCT Pub. No.: WO2013/171427
PCT Pub. Date: Nov. 21, 2013

(65) Prior Publication Data
US 2015/0134198 A1    May 14, 2015

(30) Foreign Application Priority Data

May 16, 2012   (FR) .................................... 12 54506

(51) Int. Cl.
*G01M 17/00*    (2006.01)
*G06F 7/00*    (2006.01)
(Continued)

(52) U.S. Cl.
CPC ............ *B64D 45/00* (2013.01); *G05B 23/0235* (2013.01); *G07C 5/0808* (2013.01); *B64D 2045/0085* (2013.01)

(58) Field of Classification Search
CPC ........... B64D 2045/0085; B64D 45/04; B64D 13/06; B64D 31/04; B64D 1/22; B64D 47/02; B64D 2013/0618; B64D 31/06; G07C 5/0816; G07C 5/008; G07C 5/0808; G07C 5/0825; G07C 5/085; G06F 17/30598; G06F 19/18; G06F 19/10; G06F 19/20; G06F 3/017; G06F 19/24; G06F 3/015
USPC ......... 701/34.2, 3, 14, 4, 465, 500, 120, 31.9, 701/33.4, 32.1, 33.7, 31.4, 10, 26; 702/166, 702/55, 160, 141, 94
See application file for complete search history.

(56) References Cited

U.S. PATENT DOCUMENTS 5,455,777 A * 10/1995 Fujiyama ................. G07C 3/00
                                                                          702/34
6,049,741 A *  4/2000 Kawamura ............... G05B 9/02
                                                                          700/80
(Continued)

FOREIGN PATENT DOCUMENTS

EP          1 677 172       7/2006

OTHER PUBLICATIONS

International Search Report Issued Jul. 9, 2013 in PCT/FR13/051059 Filed May 15, 2013.

*Primary Examiner* — Calvin Cheung
*Assistant Examiner* — Luis A Martinez Borrero
(74) *Attorney, Agent, or Firm* — Oblon, McClelland, Maier & Neustadt, L.L.P.

(57) ABSTRACT

A method for monitoring degradation of an on-board device of an aircraft includes comparing an abnormality score obtained for a given aircraft flight to a decision threshold and emitting an alarm when the decision threshold is exceeded. The decision threshold is determined automatically for a given alarm probability Pa, corresponding to probability of an alarm being emitted during the monitoring when the on-board device is undamaged, by: calculating plural abnormality scores for plural flights of the aircraft without degradation to obtain a probability density distribution of the abnormality score, the distribution being specific to a physical nature of the on-board device; adjusting the distribution using a non-parametric estimator of the probability density to obtain a continuous adjusted distribution function; calculating a continuous adjusted allocation function from the continuous adjusted distribution function; and reading precedent of the continuous adjusted allocation function for value 1-Pa, the precedent corresponding to the decision threshold.

6 Claims, 4 Drawing Sheets

(51) Int. Cl.
*G06F 11/30* (2006.01)
*G06F 19/00* (2011.01)
*G07C 5/00* (2006.01)
*B64D 45/00* (2006.01)
*G05B 23/02* (2006.01)
*G07C 5/08* (2006.01)

(56) References Cited

U.S. PATENT DOCUMENTS

| | | | | |
|---|---|---|---|---|
| 6,409,661 B1* | 6/2002 | Murphy | | A61B 5/742 600/300 |
| 6,532,421 B2* | 3/2003 | Miwa | | G07C 3/14 374/57 |
| 6,599,241 B1* | 7/2003 | Murphy | | G06F 19/3406 128/903 |
| 6,880,967 B2* | 4/2005 | Isozumi | | G01K 3/04 324/548 |
| 6,892,163 B1* | 5/2005 | Herzog | | G05B 23/0254 700/30 |
| 7,243,042 B2* | 7/2007 | Plotts | | G01K 3/04 374/E3.004 |
| 7,440,811 B2* | 10/2008 | Giebels | | G05B 19/41865 700/100 |
| 7,933,754 B2* | 4/2011 | Goebel | | G05B 17/02 703/6 |
| 8,321,157 B2* | 11/2012 | Omori | | G01R 31/2849 324/537 |
| 9,014,918 B2* | 4/2015 | Hagen | | G07C 5/008 701/117 |
| 9,251,502 B2* | 2/2016 | Schoonveld | | G06Q 10/10 |
| 2001/0034581 A1* | 10/2001 | Miwa | | G07C 3/14 702/42 |
| 2005/0143873 A1 | 6/2005 | Wilson | | |
| 2006/0142976 A1 | 6/2006 | Bonanni et al. | | |
| 2008/0255776 A1* | 10/2008 | Beard | | G01N 29/041 702/35 |
| 2008/0312783 A1* | 12/2008 | Mansouri | | G07C 5/0808 701/31.4 |
| 2010/0030519 A1* | 2/2010 | Collier | | F41G 7/007 702/181 |
| 2010/0100259 A1* | 4/2010 | Geiter | | G06N 5/045 701/3 |
| 2011/0265026 A1* | 10/2011 | Tarassenko | | A61B 5/02055 715/771 |
| 2013/0274991 A1* | 10/2013 | Cheriere | | B64F 5/0081 701/32.9 |
| 2013/0274992 A1* | 10/2013 | Cheriere | | B64F 5/0081 701/32.9 |
| 2013/0325219 A1* | 12/2013 | Pitard | | G07C 5/0825 701/14 |
| 2014/0149325 A1* | 5/2014 | Clifton | | A61B 5/0205 706/12 |
| 2014/0257716 A1* | 9/2014 | Lajnef | | G01N 19/00 702/34 |
| 2015/0227837 A1* | 8/2015 | Clifton | | G05B 23/0235 706/52 |

\* cited by examiner

METHOD FOR MONITORING A DEGRADATION OF AN ON-BOARD DEVICE OF AN AIRCRAFT WITH AUTOMATIC DETERMINATION OF A DECISION THRESHOLD

GENERAL TECHNICAL FIELD AND PRIOR ART

The present invention relates to the field of monitoring a degradation of an on-board device of an aircraft, such as a system for lubricating a turbojet engine, a feeder for supplying fuel to a turbojet engine, a redundant acquisition chain of a turbojet engine, a particle filter, etc.

In order to monitor an on-board device, it is known to form an indicator which is characteristic of a degradation of the on-board device. This indicator is known to a person skilled in the art as an abnormality score. Conventionally, an abnormality score is formed from measurements of physical parameters of the on-board device such as a geometric position, a control current, an opening angle, a temperature, etc. The abnormality score is characteristic of the degree of damage of the degradation. Preferably, an abnormality score is formed during each flight of the aircraft.

By way of example, the patent application filed in France on 5 Dec. 2011 under the number 1161175 by the company SNECMA discloses a method for monitoring a fuel metering device of a turbojet engine, wherein the degradation relative to the drift of the standing current of a servo-valve controlling the fuel metering device is monitored. In order to form the abnormality score which is characteristic of the drift of the standing current of the servo-valve, a plurality of measurements of the average control current are carried out, and the norm is taken.

In order to determine whether the on-board device is actually degraded, the monitoring method includes a step of comparing an abnormality score obtained for a given flight of the aircraft to a decision threshold and a step of emitting an alarm when the decision threshold is exceeded. Therefore, by following the evolution of the abnormality score, it can be detected whether the degree of degradation increases, the risk of malfunction of the on-board device can be anticipated, and the management of the maintenance operations can be improved.

Setting the decision threshold for a given degradation is crucial given that, firstly, an overly low decision threshold leads to the emission of frequent alarms when the degradation is not genuine (false alarm) and, secondly, an overly high decision threshold inhibits the emission of alarms when the degradation is genuine (non-detection).

Conventionally, for each degradation that is to be detected, the value of the decision threshold is defined empirically. In order to ensure maximum safety, the value of the decision thresholds is generally undervalued in order to minimise the risk of non-detection. As a result, the number of false alarms remains high, thereby presenting a disadvantage for airlines, who are obligated to frequently carry out maintenance operations when the on-board aeronautical device is not degraded. In order to eliminate this disadvantage, airlines impose specifications on the manufacturers of on-board devices imposing limits on the risk of errors. Taking into account the precision required, any empirical definition of a decision threshold for a method for monitoring malfunctions is thus ruled out.

There is therefore a need to determine in a reliable and precise manner the value of a decision threshold for monitoring a degradation of an on-board device of an aircraft.

GENERAL DESCRIPTION OF THE INVENTION

The invention relates to a method for monitoring a degradation of an on-board device of an aircraft, implemented by a computer, the degree of the degradation of the on-board device being defined by an abnormality score formed from measurements of physical parameters of the on-board device, the monitoring method including a step of comparing an abnormality score obtained for a given flight of the aircraft to a decision threshold and a step of emitting an alarm when the decision threshold is exceeded, the decision threshold being determined automatically for a given alarm probability Pa, corresponding to the probability of an alarm being emitted during the monitoring method when the on-board device is undamaged, by means of the following steps:

- a step of calculating a plurality of abnormality scores for a plurality of flights of the aircraft without degradation so as to obtain a distribution of the probability density of the abnormality score, the distribution being specific to the physical nature of the on-board device;
- a step of adjusting the distribution using a non-parametric estimator of the probability density so as to obtain a continuous adjusted distribution function;
- a step of calculating a continuous adjusted allocation function from the continuous adjusted distribution function; and
- a step of reading the precedent of the continuous adjusted allocation function for the value 1-Pa, the precedent corresponding to the decision threshold.

By means of the invention, the decision threshold is automatically determined with a great deal of precision according to the alarm probability Pa corresponding to the requirements of the airlines. Such a method is reliable by comparison with the methods according to the prior art, thereby making it possible to detect in a precise manner any degradation of an on-board device and to anticipate any malfunction of said device during monitoring.

Preferably, the non-parametric estimator of the probability density is a Parzen window estimator. Such an estimator is very advantageous, as it gives the same importance to the central portion of the distribution as to the end portions which are the most critical for monitoring degradation in the field of aeronautics, for which the requirements in terms of reliability are significant.

Preferably, a Parzen window estimator is defined by its window width h. Preferably, the distribution being formed from a number N of abnormality scores for a plurality of flights of the aircraft without degradation, the distribution having an estimated standard deviation $\hat{\sigma}$, the Parzen window has a width h defined according to the following formula:

$$h = \hat{\sigma}\left(\frac{4}{3*N}\right)^{1/5}$$

Such a Parzen window width h makes it possible to guarantee precision of the adjustment for monitoring on-board devices, thereby ensuring precision of the determined decision threshold.

According to a preferred aspect of the invention, the alarm probability Pa is obtained by the following formula:

$$Pa = \frac{Pe}{(1-Pe)} \cdot (1-\beta)_{a\,priori} \cdot \frac{Pd}{(1-Pd)}$$

in which formula:

Pe corresponds to the probability of the on-board device being undamaged when an alarm is emitted;

Pd corresponds to the probability of a degradation for a given flight; and $(1-\beta)_{a\,priori}$ corresponds to the probability of detecting a degradation a priori.

Advantageously, the alarm probability Pa is determined on the basis of an error probability Pe which corresponds to the practical requirements of airlines who wish to reduce the number of unnecessary maintenance steps for the on-board devices.

More preferably, the method includes:

a step of implementing the method for monitoring a degradation of the on-board device, with the decision threshold determined in advance, for a plurality of abnormality scores formed for a plurality of flights of the aircraft with degradation in order to deduce therefrom a probability of detecting a degradation a posteriori $(1-\beta)_{a\,posteriori}$ a step of determining a new alarm probability Pa on the basis of the probability of detecting a degradation a posteriori $(1-\beta)_{a\,posteriori}$ and a step of determining a new, refined decision threshold from the new alarm probability Pa.

These steps advantageously make it possible to refine the value of the decision threshold quickly and reliably when the alarm probability Pa is determined on the basis of an error probability Pe.

DESCRIPTION OF THE FIGURES

The invention will be better understood upon reading the following description, given purely by way of example and with reference to the accompanying drawings, in which.

Figure 1:
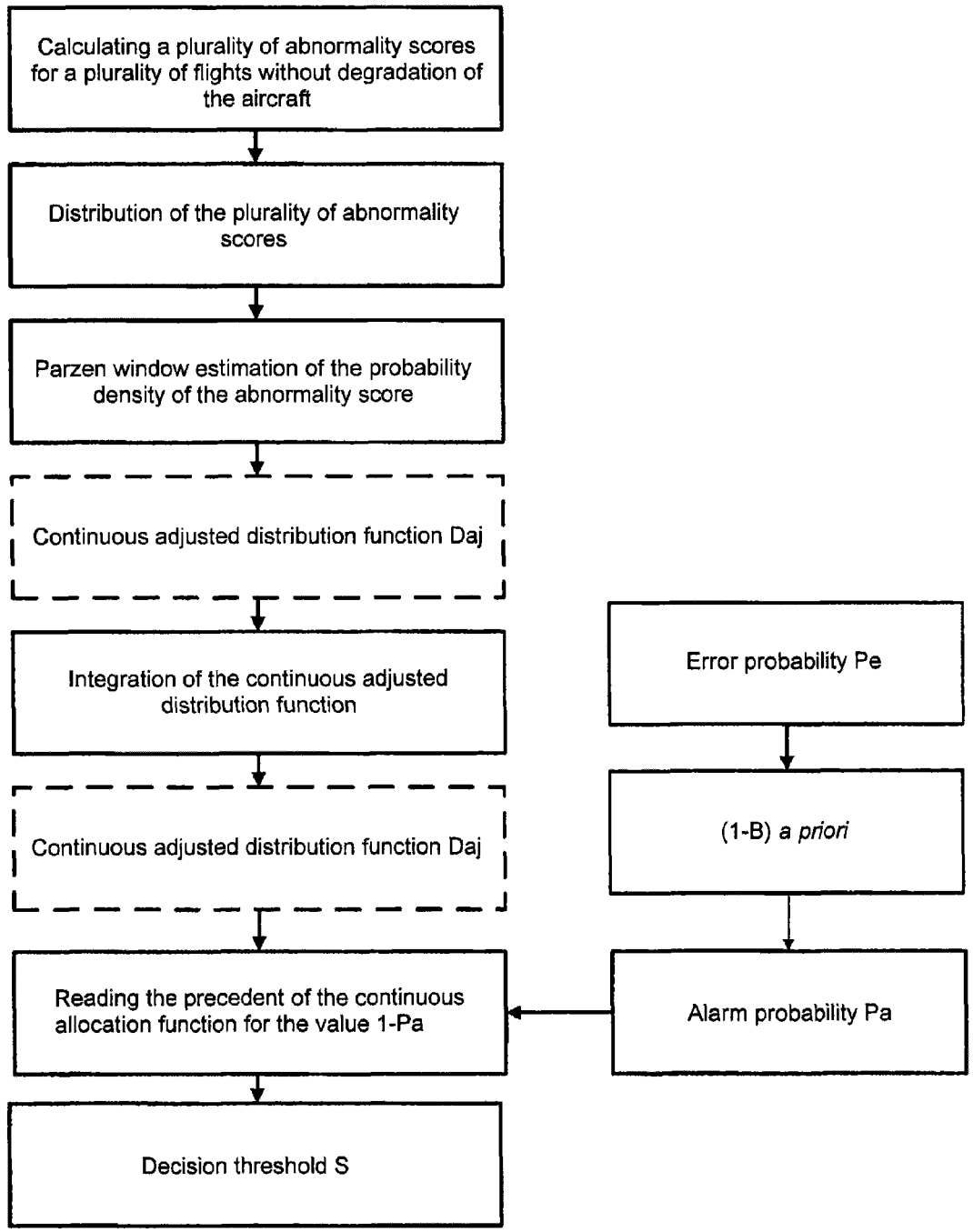
FIG. 1 is a schematic diagram of the steps for automatically determining the decision threshold according to the invention.

It should be noted that the drawings show the invention in a detailed manner in order to implement the invention, said drawings of course being able to be used to better define the invention where necessary.

DESCRIPTION OF ONE OR MORE EMBODIMENTS

The automatic determination of a decision threshold will be set out for a method for monitoring a degradation of an on-board device of an aircraft such as is known from the prior art, for example, from the patent application under the number 1161175 by the company SNECMA.

In a known manner, the degree of degradation of the on-board device is defined by an abnormality score obtained by calculating using measurements of physical parameters of the on-board device as set out above. Preferably, the abnormality score is formed by an on-board computer of the aircraft which is connected to the on-board device by a communication link. In a known manner, as set out above, the monitoring method includes a step of comparing an abnormality score obtained for a given flight of the aircraft to a decision threshold and a step of emitting an alarm when the decision threshold is exceeded.

When an alarm is emitted, a step of maintenance of the on-board device must be carried out by the airline in order to avoid a malfunction of said on-board device.

Alarm Probability

Automatically setting a decision threshold is defined for a given alarm probability Pa. Alarm probability is understood to mean the probability of an alarm being emitted during the monitoring method when the on-board device is undamaged, that is to say has no genuine degradation. In other words, an alarm probability Pa of 1% corresponds to one alarm being emitted per 100 flights without degradation.

In practice, the alarm probability Pa is not directly known. Indeed, the specifications of the airlines impose as a requirement an error probability Pe which corresponds to the probability of the on-board device being undamaged when an alarm is emitted. In other words, an error probability Pe of 1% corresponds to one undamaged on-board device per 100 alarms emitted.

In practice, when an alarm is emitted by the monitoring method, a maintenance operation is carried out by the airline. Limiting the error probability Pe thus allows airlines to limit the number of maintenance operations carried out on an on-board device which is undamaged, such operations leading to unnecessary operating costs.

Preferably, the alarm probability Pa is determined on the basis of the error probability Pe by means of the conditional probability formula (F1) below.

$$Pa = \frac{Pe}{1-Pe} \cdot (1-\beta)_{a\,priori} \cdot \frac{Pd}{(1-Pd)} \qquad (F1)$$

The formula (F1) includes the following parameters:

β corresponds to the probability of non-detection of a degradation for a given flight, 1-β thus corresponding to the probability of detecting a degradation; and Pd corresponds to the probability of a degradation for a given flight.

The formula (F1) is derived from the equations of conditional probability in which the probability Pa corresponds to an alarm when the device is undamaged (Pa=P (Alarm|Undamaged)) and the probability Pe corresponds to a undamaged device when an alarm is emitted (Pe=P (Undamaged|Alarm)).

$$P(\text{Undamaged} \mid \text{Alarm}) = \frac{P(\text{Undamaged}) \cap P(\text{Alarm})}{P(\text{alarm})}$$

$$= \frac{P(\text{Alarm}) \cap P(\text{Undamaged})}{P(\text{alarm})}$$

$$= \frac{P(\text{Alarm}) \cap P(\text{Undamaged})}{P(\text{Undamaged})} \cdot \frac{P(\text{Undamaged})}{P(\text{alarm})}$$

$$= P(\text{Alarm} \mid \text{Undamaged}) \cdot \frac{P(\text{Undamaged})}{P(\text{alarm})}$$

$$= Pa \cdot \frac{P(\text{Undamaged})}{P(\text{alarm})}$$

In other words $$P(\text{Alarm}) = Pa \cdot \frac{P(\text{Undamaged})}{P(\text{Undamaged} \mid \text{Alarm})}$$

$$= Pa \cdot \frac{(1 - Pd)}{Pe}$$

In addition, as $P(\text{Alarm}) = P(\text{Alarm} \cap \text{Undamaged}) + P(\text{Alarm} \cap \text{Degraded})$ $P(\text{Alarm}) = P(\text{Alarm} \mid \text{Undamaged}) \cdot P(\text{Undamaged}) + P(\text{Alarm} \mid \text{Degraded}) \cdot P(\text{Degraded})$ Where
$P(\text{Degraded}) = Pd$
$P(\text{Undamaged}) = 1 - Pd$
$P(\text{Alarm} \mid \text{Degraded}) = 1 - \beta$
$P(\text{Alarm} \mid \text{Undamaged}) = Pa$
$P(\text{Undamaged} \mid \text{Alarm}) = Pe$ $P(\text{Alarm}) = P(\text{Alarm} \mid \text{Undamaged}) \cdot P(\text{Undamaged}) + P(\text{Alarm} \mid \text{Degraded}) \cdot P(\text{Degraded})$ $P(\text{Alarm}) = Pa \cdot (1 - Pd) + (1 - \beta) \cdot Pd$ $P(\text{Alarm}) = Pa \cdot (1 - Pd) + (1 - \beta) \cdot Pd$ By means of the two equalities relating to P (Alarm), (F1) is thus derived.

In the formula (F1), the probability of a degradation for a given flight Pd is known by experimentation or estimation and can, for example, be approximately $10^{-7}$. The probability of detecting a degradation $(1-\beta)_{a\ priori}$ is fixed a priori at 1 and refined by iteration as will be explained in detail below in order to improve the precision of the decision threshold.

By way of example, conventionally an alarm probability Pa of approximately 10E-9 for a required error probability Pe of approximately 1%, a probability of detecting a degradation $(1-\beta)_{a\ priori}$ of approximately 1 and a probability of a degradation for a flight Pd of approximately $10^{-7}$ are obtained.

Abnormality Score, Distribution and Allocation Function

The on-board device on the aircraft conventionally comprises a plurality of sensors in order to measure physical parameters of the on-board device (control current, geometric positions, temperatures, etc.). Conventionally, some of the physical parameters measured are used to form an abnormality score which is based on the degree of degradation of the on-board device (positioning error, drift of the control current, overheating, etc.). An abnormality score is obtained by transformation of one or more measurements of physical parameters of the on-board device. For example, the measurements obtained are standardised by an absolute value or by the Mahalanobis distance.

As shown in FIG. 1, the method according to the invention includes a step of calculating a plurality of abnormality scores for a plurality of flights of the aircraft without degradation. For flights of the aircraft for which the on-board device is undamaged, a plurality of abnormality scores are calculated conventionally from measurements of physical parameters of the on-board device carried out during each flight of the aircraft. The values of the abnormality scores vary according to the flights of the aircraft and according to the physical nature of the on-board device.

Figure 3:
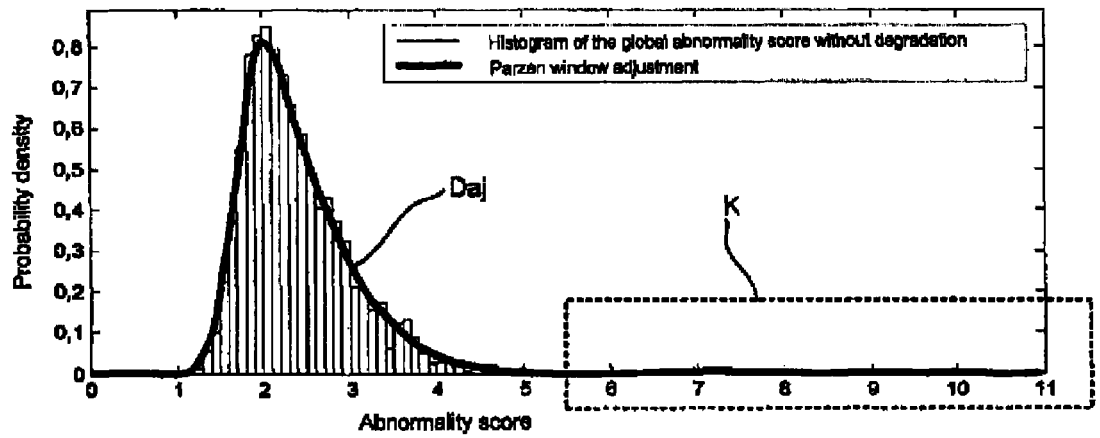
FIG. 3 shows the distribution of abnormality scores obtained for an on-board computer of an aircraft for a plurality of flights without degradation, the curve showing an adjustment of the obtained distribution.

The distribution of the probability density of the abnormality score is shown in FIG. 3 by a histogram. As shown in this drawing, an abnormality score equal to 2 is the most probable (probability density of 0.8). The higher the number of abnormality scores, the more precise the distribution. Unfortunately, a high number of abnormality scores requires a large number of aircraft flights, which is not desirable. In this example, the abnormality scores have been obtained over 200 to 500 flights.

The alarm probability Pa, which as a reminder corresponds to the probability of an alarm being emitted during the monitoring method when the on-board device is undamaged, is conventionally approximately 10E-9. In other words, the decision threshold S according to the alarm probability Pa is an abnormality score value above which are 10E-9 of the abnormality scores obtained for flights without degradation.

Even if a very large number of abnormality scores are available, the distribution in FIG. 3 is not precise for low value quantiles, for example for a quantile of 10E-9. By graphical analysis, it can only be deduced that the value of the decision threshold S is greater than 5.5 and has to be located in the window K shown in FIG. 3. Indeed, the distribution is obtained by means of discrete values of abnormality scores, thereby limiting the precision of the distribution.

Adjustment of the Distribution Function

In order to improve the interpretation of the distribution, with reference to FIG. 1, the method according to the invention includes a step of adjusting the distribution using an estimator of the probability density so as to obtain a continuous adjusted distribution function Daj shown in FIG. 3. According to the invention, a step of a Parzen window adjustment of the distribution function makes it possible to get closer in a precise manner to the allocation function obtained discretely.

This non-parametric approach makes it possible to obtain an adjustment close to the distribution because a Parzen window adjustment advantageously gives the same weight to the ends of the distribution as to the central portion, thereby making it possible to interpret the end quantiles in a precise manner.

As a reminder, the Parzen window adjustment is a non-parametric adjustment for estimating the probability density of a random variable. It is commonly referred to as kernel density estimation because functions referred to as "kernels" are used to estimate the probability density of a random variable. The analytical expression of the Parzen probability density is:

$$\hat{f}_h(x) = \frac{1}{N*h} \sum_{i=1}^{N} K\left(\frac{x - x_i}{h}\right)$$

Where K and h are, respectively, the kernel function and the width or depth of the Parzen window.

The concept of the Parzen window adjustment is that of estimating the probability density of a random variable for each value of x by means of a kernel function K( ) which most of the time is based on probability density. The closer the observation x is to the training samples xi, the more significant the contribution of x is in the kernel function $\hat{f}_h(x)$ centred on xi. Inversely, the less close the observation x is to the training samples xi, the less significant the contribution of x is in the kernel function $\hat{f}_h(x)$ centred on xi. Then, the estimator of the probability density function is formed by an average of the values of the kernel functions. This estimator is governed by a smoothing parameter "h", which is referred to as a width or depth of the window. The estimation of probability density, which is dependent on the smoothing parameter "h", has good statistical properties. Under certain non-restrictive conditions on "h", the Parzen window estimator is consistent.

There are several kernel functions (Gaussian, box, triangle, etc.) but the performance of the Parzen window is mainly based on the selection of the width or depth of the window "h". A compromise between the bias and the variance of the estimator has to be made in order to select the width "h".

The width of the window can be selected by cross validation, by maximising the probability of the kernel function. In this example, a Gaussian kernel (F2) has been used. As for the width or depth of the window, it is based on an estimation of the standard deviation $\hat{\sigma}$ and of the size N of all of the training samples according to formula (F3).

$$K(x) = \frac{e^{(-0.5x^2)}}{\sqrt{2\pi}} \quad (F2)$$

$$h = \hat{\sigma}\left(\frac{4}{3*N}\right)^{1/5} \quad (F3)$$

A Parzen adjustment is very close to the elementary distribution observed for several flights, as will be set out in the following, which makes an optimal adjustment by comparison with the other known adjustments.

Adjusted Allocation Function

In order to determine the value of the decision threshold S in a simple and quick manner, the adjusted distribution function Daj is conventionally integrated in order to obtain an adjusted allocation function Raj which is also continuous.

Figure 4:
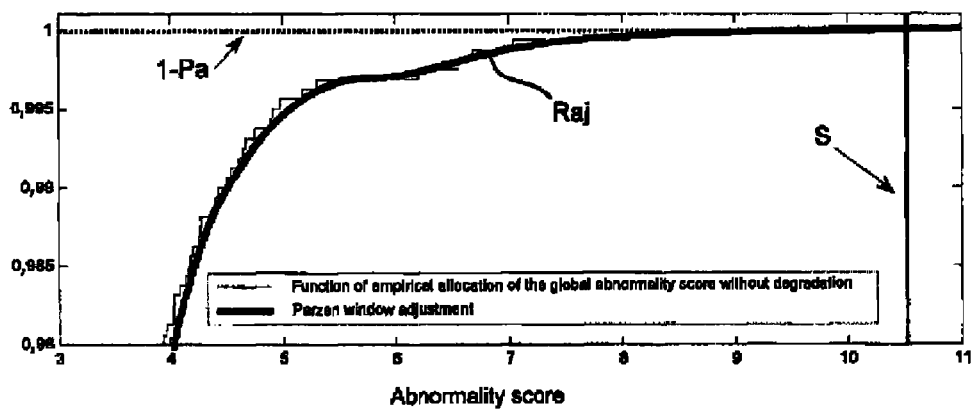
FIG. 4 shows the allocation function derived from the distribution in FIG. 3, the curve showing an adjustment of the allocation function.

The adjusted reallocation function Raj of the adjusted distribution function Daj from FIG. 3 is shown in FIG. 4. As a reminder, an allocation function F of a real random variable X is the function $F_x$ which associates $F_x(x)=P(X\le x)$ with any real x. With reference to FIG. 4, the allocation function has a value of 99% for an abnormality score of 4.5. This signifies that 99% of the abnormality scores for an undamaged device are less than 4.5.

In addition, in order to respect the requirement of an alarm probability Pa of approximately 10E-9, it is necessary to precisely read the precedent of the adjusted allocation function Raj, for which said function is equal to 1-Pa, the precedent corresponding to the desired decision threshold S. Indeed, this signifies that 1-10E-9 of the abnormality scores for an undamaged device are less than the decision threshold S. In other words, 10E-9 of the abnormality scores for an undamaged device which can generate an alarm are greater than the decision threshold S. The precedent corresponds to the desired decision threshold S for the determined alarm probability Pa.

Determination of the Decision Threshold

With reference to FIG. 1, the method according to the invention includes a step of reading the precedent of the adjusted allocation function Raj for the value 1-Pa. Advantageously, since the adjusted allocation function Raj is continuous and one-to-one, it can be deduced in a very precise manner for which precedent the adjusted allocation function Raj takes the value 1-Pa, i.e. the decision threshold S which in this case is equal to 10.5 as shown in FIG. 3.

Figure 6:
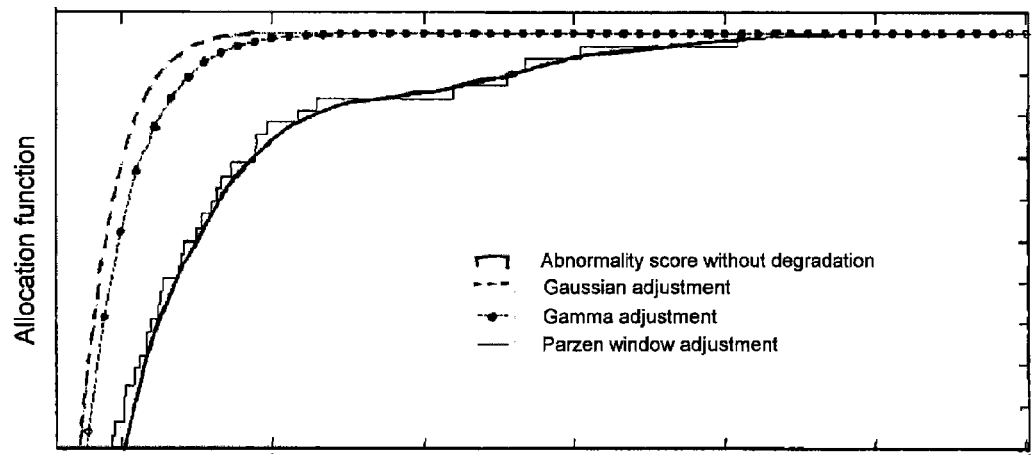
FIG. 6 is a comparison of different types of adjustments (Gaussian, gamma, Parzen) of the allocation function.

By way of information, a comparison of several types of adjustments of the allocation function (Gaussian adjustment, gamma adjustment and Parzen adjustment) has been shown in FIG. 6. As shown in FIG. 6, the adjustment using the Parzen method is very close to the abnormality score values obtained for several flights. Conventionally, in order to validate the quality of an adjustment, a test of the relevance of the adjustment known to a person skilled in the art is carried out which is known as the Kolmogorov-Smirnov test. In the present case, only the Parzen adjustment passes the Kolmogorov-Smirnov test, the other adjustments being rejected.

Figure 7:
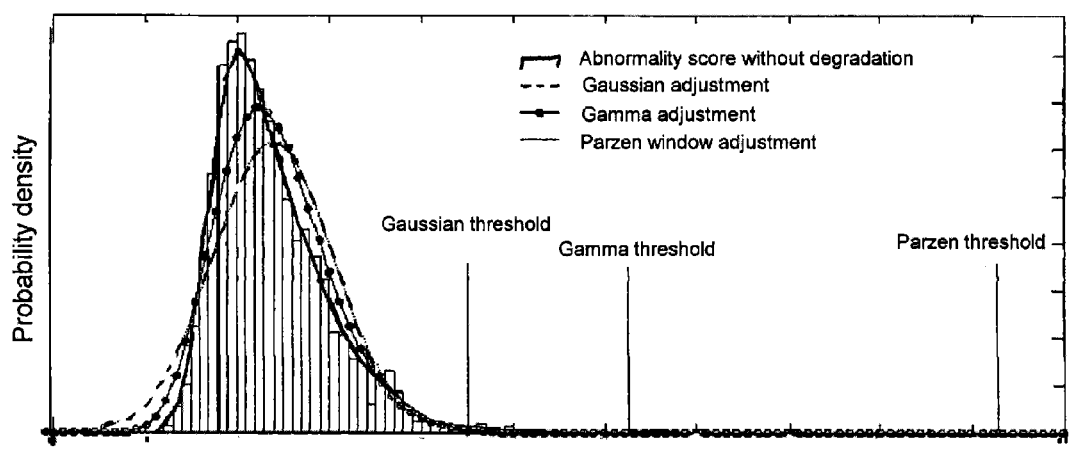
FIG. 7 is a comparison of different decision thresholds obtained on the basis of the type of adjustment.

This precision of the Parzen window adjustment translates into a precise determination of the decision threshold. Indeed, as shown in FIG. 7, a decision threshold of 6.5 is obtained with a Gaussian adjustment, a decision threshold of 8.2 with a gamma adjustment and a decision threshold of 10.5 with a Parzen window adjustment.

Refining the Decision Threshold Value

Figure 5:
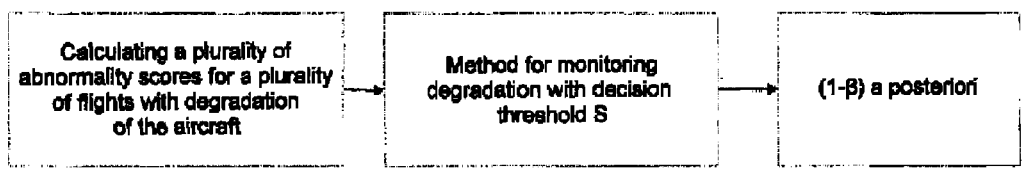
FIG. 5 is a schematic diagram of the step of refining the value of the decision threshold.

A determination of the decision threshold has previously been set out in which the alarm probability Pa is known or estimated from the error probability Pe. When the alarm probability Pa is estimated, a step of refining the decision threshold S can optionally be carried out by refining the probability of detecting a degradation (1–β) as shown in the schematic diagrams in FIGS. 2 and 5.

Figure 2:
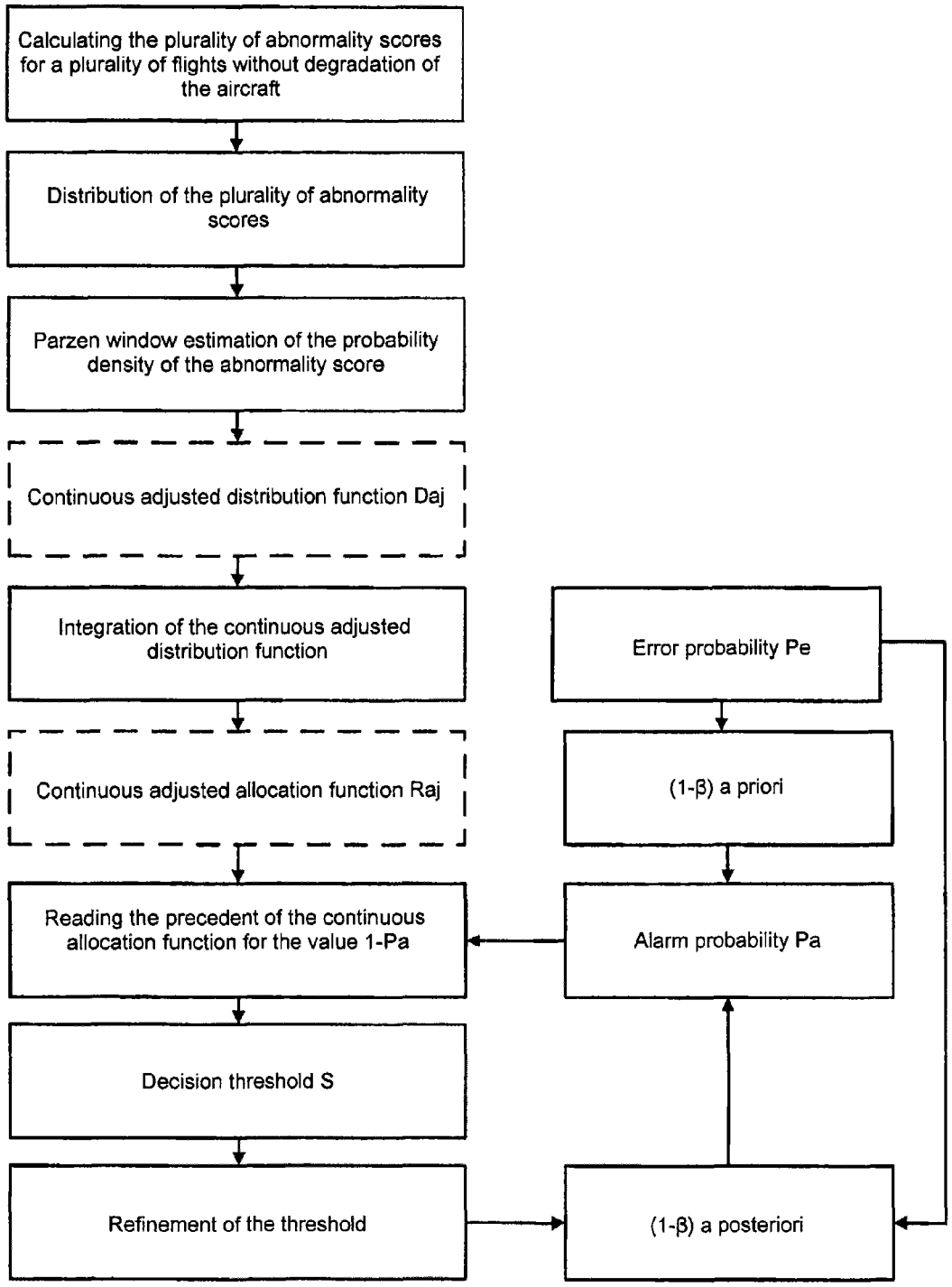
FIG. 2 is a schematic diagram of the steps for automatically determining the decision threshold according to the invention with a step of refining the decision threshold.

As shown in FIG. 2, the monitoring method is implemented with the decision threshold S as determined previously for a plurality of abnormality scores obtained during flights with degradation, preferably obtained by simulation. During the monitoring method, the different abnormality scores are compared to the decision threshold S, thereby making it possible to deduce a posteriori the probability of detecting a degradation (1–β). Indeed, it is sufficient to observe the number of alarms emitted relative to the number of flights with monitored degradation.

As shown in FIG. 2, by iteration, in the steps of determining the decision threshold, the value $(1-\beta)_{a\,priori}$ is replaced with the value $(1-\beta)_{a\,posteriori}$ obtained during the refinement in order to obtain a new, more precise value of the decision threshold S. The refining step can be iterated in order to converge towards the most precise value of the decision threshold S.

In an implementation of the invention, the method for monitoring a degradation of an on-board device of an aircraft, the method for automatically determining a decision threshold and the method for generating degradations are implemented using a computer, preferably using a plurality of processors of the computer.

By way of example, the monitoring method is implemented in order to monitor a fuel metering device of an aircraft turbojet engine.

The processor for determining the decision threshold receives a plurality of abnormality scores without degradation from the monitoring processor and determines, for a given error probability Pe and a probability for detecting a priori a degradation using the monitoring method, the decision threshold S. Once the decision threshold S is determined, this is transmitted to the monitoring processor, which can then compare the calculated abnormality scores to said decision threshold S in order to monitor the evolution of the degradation of the fuel metering device during the flights of the aircraft.

In order to refine the value of the decision threshold S, the processor for generating degradations simulates degraded flight data which are submitted to the monitoring processor which emits a certain number of alarms on the basis of the data received, thereby making it possible to deduce therefrom a posteriori the probability of detecting a degradation using the monitoring method. This value is then communicated to the processor for determining the decision threshold S which supplies a new value of the decision threshold S for the new detection probability obtained.

The method is iterated until a convergence of the value of the decision threshold S is obtained. In practice, a satisfactory convergence is obtained from two iterations.

The invention has been set out for a fuel metering device but it can be applied to any on-board device of an aircraft.

The invention claimed is:

1. A method for monitoring a degradation of an on-board device of an aircraft, comprising:
    measuring physical parameters of the on-board device of the aircraft;
    determining, using a computer, an abnormality score of the on-board device for a given flight of the aircraft;
    comparing the abnormality score obtained for the given flight of the aircraft to a decision threshold; and
    emitting an alarm when the decision threshold is exceeded,
    wherein the decision threshold is determined automatically for a given alarm probability Pa, corresponding to a probability of an alarm being emitted during the monitoring method when the on-board device is undamaged, by:
        calculating a plurality of abnormality scores for a plurality of flights of the aircraft without degradation;
        obtaining a distribution of a probability density of the plurality of abnormality scores, the distribution being specific to a physical nature of the on-board device;
        obtaining a continuous adjusted distribution function by adjusting the distribution using a non-parametric estimator of the probability density;
        calculating a continuous adjusted allocation function from the continuous adjusted distribution function; and
        determining the decision threshold by reading a precedent of the continuous adjusted allocation function for the value 1-Pa, the precedent corresponding to the decision threshold.

2. The method for monitoring according to claim 1, wherein the non-parametric estimator of the probability density is a Parzen window estimator.

3. The method for monitoring according to claim 2, wherein the distribution is formed from a number N of abnormality scores for a plurality of flights of the aircraft without degradation, the distribution having an estimated standard deviation $\hat{\sigma}$, the Parzen window has a width h defined according to formula:

$$h = \hat{\sigma}\left(\frac{4}{3*N}\right)^{1/5}.$$

4. The method for monitoring according to claim 1, wherein the alarm probability Pa is obtained using formula:

$$P\alpha = \frac{Pe}{(1-Pe)} \cdot (1-\beta)_{apriori} \cdot \frac{Pd}{(1-Pd)}$$

in which:
    Pe corresponds to the probability of the on-board device being undamaged when an alarm is emitted;
    Pd corresponds to the probability of a degradation for a given flight; and
    $(1-\beta)_{a\ priori}$ corresponds to the probability of detecting a degradation priori.

5. The method for monitoring according to claim 4, further comprising:
    implementing the method for monitoring a degradation of the on-board device, with the decision threshold determined in advance, for a plurality of abnormality scores formed for a plurality of flights of the aircraft with degradation to deduce therefrom a probability of detecting a degradation a posteriori $(1-\beta)_{a\ posteriori}$;
    determining a new alarm probability Pa on the basis of the probability of detecting a degradation a posteriori $(1-\beta)_{a\ posteriori}$; and
    determining a new, refined decision threshold from the new alarm probability Pa.

6. The method for monitoring according to claim 1, wherein the on-board device is a fuel metering device.

* * * * *